US011655581B2

United States Patent
Rupnow

(10) Patent No.: US 11,655,581 B2
(45) Date of Patent: May 23, 2023

(54) WASHING SYSTEMS

(71) Applicant: Gurtler Industries, Inc., South Holland, IL (US)

(72) Inventor: Andrew Rupnow, Wisconsin Dells, WI (US)

(73) Assignee: Gurtler Industries, Inc., South Holland, IL (US)

( * ) Notice: Subject to any disclaimer, the term of this patent is extended or adjusted under 35 U.S.C. 154(b) by 0 days.

(21) Appl. No.: 17/549,286

(22) Filed: Dec. 13, 2021

(65) Prior Publication Data

US 2022/0170196 A1 Jun. 2, 2022

Related U.S. Application Data

(63) Continuation of application No. 16/321,390, filed as application No. PCT/US2017/046349 on Aug. 10, 2017, now Pat. No. 11,198,968.

(60) Provisional application No. 62/373,191, filed on Aug. 10, 2016.

(51) Int. Cl.
*D06F 39/08* (2006.01)
*C02F 1/78* (2023.01)
*D06F 31/00* (2006.01)
*C02F 1/32* (2023.01)
(Continued)

(52) U.S. Cl.
CPC ............ *D06F 39/083* (2013.01); *C02F 1/325* (2013.01); *C02F 1/78* (2013.01); *D06F 31/005* (2013.01); *C02F 1/32* (2013.01); *C02F 2103/002* (2013.01); *C02F 2201/782* (2013.01);
(Continued)

(58) Field of Classification Search
CPC .................................................. D06F 39/083
See application file for complete search history.

(56) References Cited

U.S. PATENT DOCUMENTS

| 3,707,856 A | 1/1973 | Niewyk |
| 3,961,231 A | 6/1976 | Gillespie |
| 4,003,832 A | 1/1977 | Henderson |

(Continued)

FOREIGN PATENT DOCUMENTS

| CA | 2310864 A1 | 12/2001 |
| CN | 1553973 A | 12/2004 |

(Continued)

OTHER PUBLICATIONS

International Search Report in International Application No. PCT/US2017/046346, dated Dec. 4, 2017 (4 pages).

(Continued)

*Primary Examiner* — Jason Y Ko
(74) *Attorney, Agent, or Firm* — Greer, Burns & Crain, Ltd.

(57) ABSTRACT

A washing system includes a housing, a drain line, and a recirculation line. The housing receives, via a fluid inlet, fresh water during one or more wash cycles of a wash session. The drain line is coupled to the housing and includes a valve and is also configured to receive soiled water from the housing during the wash session. The recirculation line is coupled to and extends from the valve of the drain line and is configured to receive a portion of the soiled water via the valve. The recirculation line includes an integrated fluid sanitizer module configured to at least partially sanitize the portion of the soiled water, and the recirculation line is configured to deliver sanitized water from the integrated fluid sanitizer module to the fluid inlet of the housing.

20 Claims, 4 Drawing Sheets

(51) Int. Cl.
*D06F 39/10* (2006.01)
*C02F 103/00* (2006.01)

(52) U.S. Cl.
CPC .... *C02F 2303/04* (2013.01); *C02F 2305/023* (2013.01); *D06F 39/10* (2013.01); *Y02W 10/37* (2015.05)

(56) References Cited

U.S. PATENT DOCUMENTS

| | | |
|---|---|---|
| 4,230,571 A | 10/1980 | Dadd |
| 5,097,556 A | 3/1992 | Engel |
| 5,181,399 A | 1/1993 | Engel |
| 5,241,720 A | 9/1993 | Engel |
| 5,765,403 A | 6/1998 | Lincoln |
| 5,806,120 A | 9/1998 | McEachern |
| 5,960,501 A | 10/1999 | Burdick |
| 6,085,556 A | 7/2000 | Moon |
| 6,115,862 A | 9/2000 | Cooper |
| 6,685,825 B1 | 2/2004 | Chang |
| 7,081,225 B1 | 7/2006 | Hollander |
| 7,493,782 B2 | 2/2009 | Daniels |
| 2003/0110815 A1 | 6/2003 | Poy |
| 2004/0221873 A1 | 11/2004 | Rusciolelli |
| 2008/0092601 A1 | 4/2008 | Konides |
| 2010/0095715 A1 | 4/2010 | Ulger |
| 2010/0329941 A1 | 12/2010 | Moore |
| 2011/0147283 A1 | 6/2011 | Taylor |
| 2012/0017379 A1 | 1/2012 | Moore |
| 2012/0094887 A1 | 4/2012 | Tanaka |
| 2012/0231549 A1 | 9/2012 | Miller |
| 2014/0053343 A1 | 2/2014 | Poy |
| 2014/0283564 A1 | 9/2014 | Cagliani |
| 2015/0033805 A1 | 2/2015 | Rupnow |
| 2016/0053425 A1 | 2/2016 | Wolff |
| 2016/0168776 A1 | 6/2016 | Xu |
| 2017/0321365 A1 | 11/2017 | Rupnow |

FOREIGN PATENT DOCUMENTS

| | | |
|---|---|---|
| CN | 202482160 U | 10/2012 |
| CN | 103723803 A | 4/2014 |
| CN | 105229017 A | 1/2016 |
| CN | 105274776 A | 3/2019 |
| EP | 3770122 A1 | 1/2021 |
| JP | 2000-051310 A | 2/2000 |
| KR | 100901794 | 6/2009 |
| KR | 2013-0074430 A | 7/2013 |
| WO | WO 2003/016608 A1 | 2/2003 |
| WO | WO 2007/143785 A1 | 12/2007 |
| WO | WO 2010/028467 A1 | 3/2010 |
| WO | WO 2014/146165 A1 | 9/2014 |
| WO | WO 2016/054517 A1 | 4/2016 |
| WO | WO 2016/094658 A1 | 6/2016 |

OTHER PUBLICATIONS

Written Opinion in International Application No. PCT/US2017/046349, dated Dec. 4, 2017 (6 pages).
Supplementary European Search Report in European Patent Application No. 17821458.1, dated Jul. 20, 2018 (6 pages).

WASHING SYSTEMS

CROSS-REFERENCE TO RELATED APPLICATIONS

This application is a continuation of U.S. Non-provisional application Ser. No. 16/321,390, filed Jan. 28, 2019, now allowed, which is a U.S. National Stage Entry of International Application No. PCT/US2017/046349, filed Aug. 10, 2017, which claims the benefit of and priority to U.S. Provisional Application No. 62/373,191, filed Aug. 10, 2016, each of which is hereby incorporated by reference herein in its entirety.

FIELD OF THE PRESENT DISCLOSURE

The present disclosure relates generally to washing systems, and more particularly, to washing systems including a recirculation line with an integrated fluid sanitizer module.

BACKGROUND

In industrial laundry applications, tunnel washing systems are often used to clean large volumes of soiled laundry (e.g., clothes, linens, fabrics, or the like). Typically, soiled laundry is placed into a loading hopper of a wash tunnel and is then moved through a series of zones or cycles, including a pre-wash zone, a main wash zone, and a rinse zone. After the laundry exits the rinse zone, a press then removes excess water from the laundry prior to moving the laundry to a dryer. Within each zone, chemicals and fresh water (collectively, "wash water") is added to perform a desired cleaning operation. As the wash water flows through each zone and contacts the soiled laundry, the wash water may be contaminated by bacteria, viruses, algae, mold, fungi, or the like from the soiled laundry. As a result, soiled wash water is then removed from each zone via a drain and exits the system as waste. In an effort to reduce waste water, soiled wash water can be recirculated within the washing system. However, recirculation of soiled wash water leads to acceleration growth of bacteria, viruses, algae, mold, fungi, or the like in the wash water.

In addition, the pH of the wash water in each of the various zones must be controlled to effectively and efficiently clean the soiled laundry. For example, the pH of the wash water at the beginning of the main wash zone can be about 10.5, while the pH of the wash water at the end of the rinse zone can be between about 5 and 6. To achieve this difference in pH, chemicals are introduced into each of the zones or cycles to raise or lower the pH as required. Continually adding these chemicals to achieve a desired pH level adds to the costs of operating the tunnel washing system.

The present disclosure addresses these and other problems.

SUMMARY

According to some implementations of the present disclosure, a washing system includes a housing, a drain line, and a recirculation line. The housing is configured to receive, via a fluid inlet, fresh water during one or more wash cycles of a wash session. The drain line is coupled to the housing and includes a valve, and the drain line is configured to receive soiled water from the housing during the wash session. The recirculation line is coupled to and extends from the valve of the drain line and is configured to receive a portion of the soiled water via the valve. The recirculation line includes an integrated fluid sanitizer module configured to at least partially sanitize the portion of the soiled water, and the recirculation line is configured to deliver sanitized water from the integrated fluid sanitizer module to the fluid inlet of the housing.

According to some implementations of the present disclosure, a tunnel washing system includes a housing, a press, and a recirculation line. The housing includes a pre-wash zone, a main wash zone, and a rinse zone. The main wash zone includes a first fluid inlet and a first fluid outlet, and the rinse zone includes a second fluid inlet and a second fluid outlet. The press is coupled to a press tank which is configured to receive and store therein soiled press water. The recirculation line is coupled to the press tank and is configured to receive a portion of the soiled press water. The recirculation line includes an integrated fluid sanitizer module configured to at least partially sanitize the portion of the soiled press water.

The above summary of the present disclosure is not intended to represent each embodiment, or every aspect, of the present disclosure. Additional features and benefits of the present disclosure are apparent from the detailed description and figures set forth below.

Figure 1:
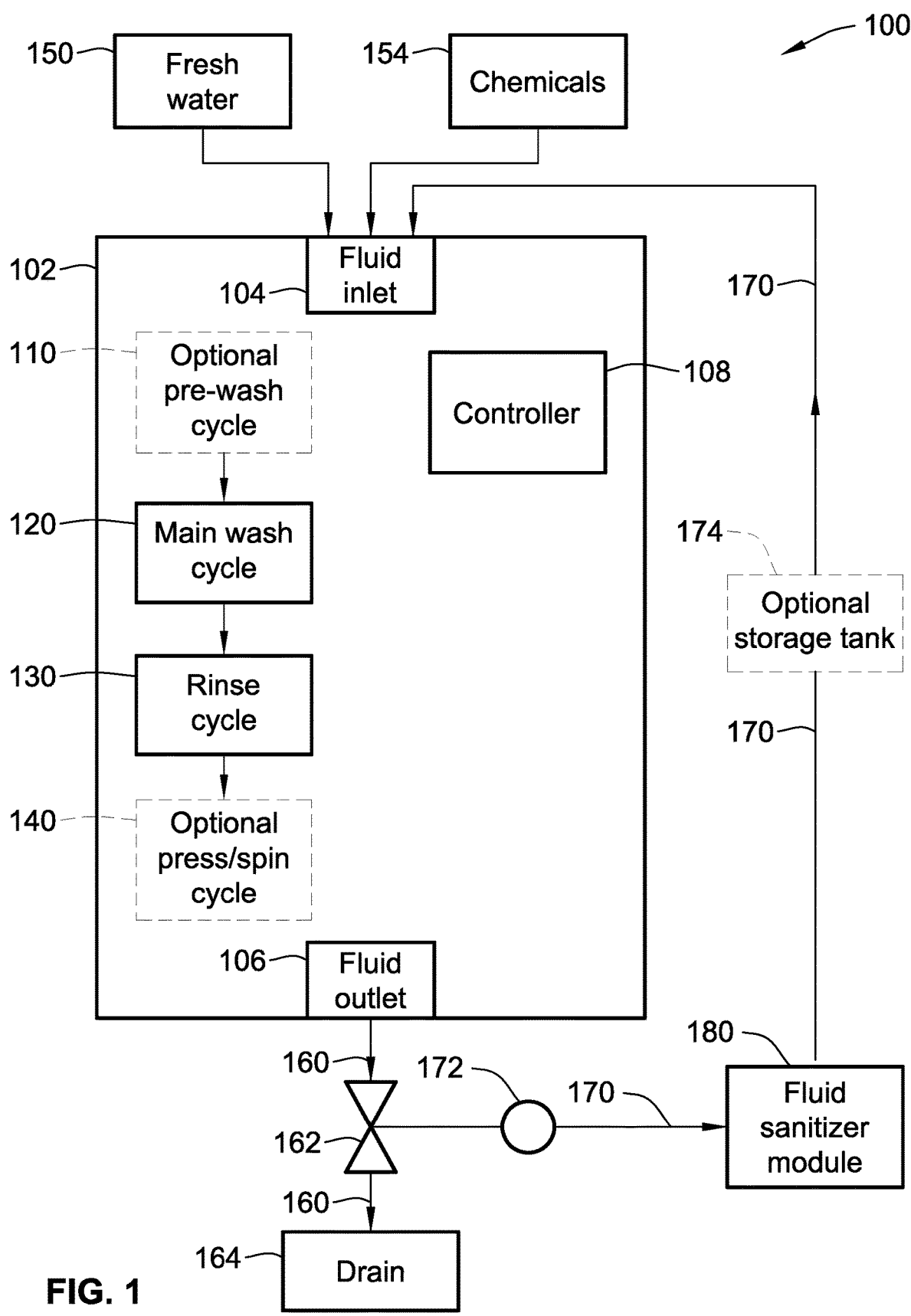
FIG. 1 is a schematic illustration of a washing system according to some implementations of the present disclosure.

While the present disclosure is susceptible to various modifications and alternative forms, specific embodiments and implementations are shown by way of example in the drawings and are described in detail herein. It should be understood, however, that the disclosure is not intended to be limited to the particular forms disclosed. Rather, the disclosure is to cover all modifications, equivalents and alternatives falling within the spirit and scope of the disclosure.

DETAILED DESCRIPTION

Referring to FIG. 1, a washing system 100 includes a housing 102, a controller 108, a fresh water reservoir or tank 150, a chemical reservoir or tank 154, a drain line 160, and a recirculation line 170. Generally, the washing system 100 is used for performing one or more wash sessions to clean soiled laundry (e.g., clothes, linens, fabrics, or the like).

Figure 2:
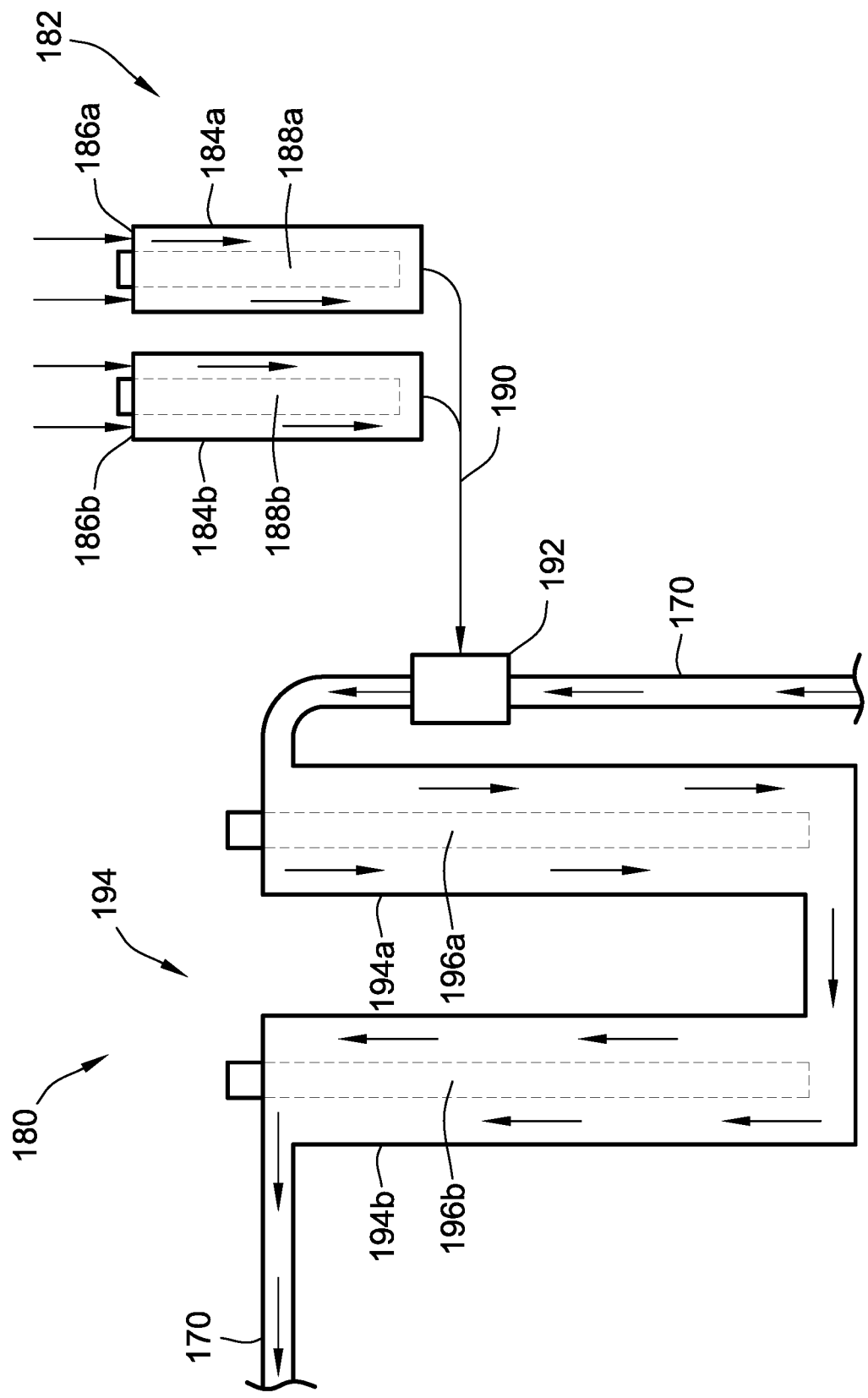
FIG. 2 is a partial cross-sectional view of an integrated fluid sanitizer module of the tunnel washing system of FIG. 1 according to some implementations of the present disclosure.

A loading hopper or inlet (not shown) of the housing 102 receives soiled laundry to be cleaned during a given wash session, and can be a residential washer or a commercial tunnel washer (e.g., FIG. 2). As shown, the housing 102 includes a fluid inlet 104 and a fluid outlet 106. The fluid inlet 104 is coupled to the fresh water reservoir or tank 150 and the chemical reservoir or tank 154 (e.g., via a metal pipe, a PVC pipe, a hose, or the like) such that the housing 102 receives fresh water from the fresh water reservoir or tank 150 and chemicals from the chemical reservoir or tank 154 for use during the wash session. The fluid inlet 104, the fresh water reservoir or tank 150, the chemical reservoir or tank 154, or any combination thereof can include one or more valves (not shown) for use in controlling the volume of fresh water and/or chemicals that flow into the housing 102. The chemical reservoir or tank 154 stores one or more chemicals for use during the wash session, such as, for example, detergent, bleach, alkalis, sours, solvents, hydrogen peroxide, paracetic acid, mineral spirits, or the like, or any combination thereof.

Each wash session includes one or more cycles, including, for example, a pre-wash cycle 110, a main wash cycle 120, a rinse cycle 130, and press/spin cycle 140. At the beginning of each of the one or more cycles, the housing 102 receives fresh water from the fresh water reservoir or tank 150 and/or chemicals from the chemical reservoir or tank 154 via the fluid inlet 104 (collectively, "wash water"). The wash water contacts the soiled laundry in the housing 102 for a predetermined cycle time (e.g., between about one minute and about sixty minutes, between about three minutes and about six minutes, between about six minutes and about twelve minutes, between about five minutes and about ten minutes, etc.). In some implementations, the housing 102 rotates or oscillates to agitate the soiled laundry to mix the soiled laundry with the wash water.

More specifically, the optional pre-wash cycle 110 is used to remove large debris from the soiled laundry prior to the main wash cycle 120. During the main wash cycle 120, chemicals are used to clean the soiled laundry (e.g., remove debris, dirt, stains and at least partially sanitize). Fresh water and/or chemicals are then used during the rinse cycle 130 to remove residual wash water from the main wash cycle 120 and the optional pre-wash cycle 110. During the optional press/spin cycle 140, excess water from the rinse cycle 130 is removed from the cleaned laundry to reduce the required drying time. The excess water can be removed during the optional press/spin cycle 140 by pressing or compressing the cleaned laundry to expel the excess water, or by spinning the cleaned laundry to create centrifugal forces that expel the excess water.

Soiled wash water is drained from the housing 102 via the fluid outlet 106. The soiled wash water can be drained before each of the cycles of the wash session, during each of the cycles of the wash session, after each of the cycles of the wash session, or any combination thereof. The drain line 160 is coupled to the fluid outlet 106, receives the soiled wash water, and delivers the soiled wash water to a main drain 164 (e.g., a sewage or waste water line). The drain line 160 includes a drain valve 162 upstream of the main drain 164 that is coupled to the recirculation line 170. Instead of permitting all of the soiled wash water in the drain line 160 to flow into the main drain 164, the drain valve 162 selectively diverts a portion of the soiled wash water received by the drain line 160 to the recirculation line 170 (e.g., between about 30 percent and about 50 percent of the soiled water received by the drain line 160).

The recirculation line 170 includes a pump 172, an integrated fluid sanitizer module 180, and an optional storage tank 174. A first end of the recirculation line 170 is coupled to the drain valve 162 and a second end of the recirculation line 170 is coupled to the fluid inlet 104 of the housing 102. As shown, the pump 172 is positioned upstream of the integrated fluid sanitizer module 180 and the fluid inlet 104 to force the predetermined volume of the soiled water to flow through the recirculation line 170. The recirculation line 170 can be a metal pipe (e.g., copper, stainless steel, or the like), a PVC pipe, a hose, or the like, or any combination thereof.

As shown in FIG. 2, the integrated fluid sanitizer module 180 is generally used to at least partially sanitize the soiled wash water in the recirculation line 170 and includes an oxidative gas generator 182, a manifold 192, and a counter-flow mixer 194. The oxidative gas generator 182 is used to produce a volume of o-zone gas and includes a first lamp housing 184a and a second lamp housing 184b. The first lamp housing 184a includes a first gas inlet 186a and a first ultra-violet ("UV") lamp 188a disposed therein. Similarly, the second lamp housing 184b includes a second gas inlet 186b and a second UV lamp 188b disposed therein. The first and second gas inlets 186a, 186b permit ambient air to enter each of the respective lamp housings 184a, 184b and to flow past each respective UV lamp 188a, 188b. When powered by a power source (not shown), the first and second UV lamps 188a, 188b emit a wavelength of light between about 100 nm and about 500 nm.

When ambient air enters the first gas inlet 186a and the second gas inlet 186b and flows past the first UV lamp 188a and the second UV lamp 188b while both are emitting a wavelength of light of between about 180 nm and about 260 nm (e.g., about 187 nm), the wavelength of light breaks down oxygen molecules ($O_2$) from the ambient air into oxygen atoms (O). These oxygen atoms then react with other oxygen ($O_2$) molecules in the ambient air to produce the volume of o-zone gas ($O_3$ molecules). O-zone is a pale blue gas with a distinctively pungent smell and is a powerful disinfectant, oxidant, and deodorizer.

In some implementations, the oxidative gas generator 182 can include an optional fan (not shown) to aid in forcing ambient air through the gas inlet 186 to produce the volume of o-zone gas. While the oxidative gas generator 182 is shown as having two lamp housings 184a and 184b and two UV lamps 188a and 188b, the oxidative gas generator 182 can include any number of lamp housings and/or UV lamps (e.g., one UV lamp, four UV lamps, etc.). In other implementations, the integrated fluid sanitizer module 180 includes an oxidative gas generator that does not include a UV lamp and produces the volume of o-zone gas using any other suitable mechanism (e.g., corona discharge). Alternatively, the integrated fluid sanitizer module 180 can include an o-zone gas storage tank (not shown) filled with o-zone gas and/or an oxygen storage tank (not shown) filled with oxygen gas. In such implementations, the oxygen storage tank can be used in conjunction with the oxidative gas generator 182 described above to deliver oxygen gas through the first and second gas inlets 186a, 186b to increase the production of o-zone gas.

Once produced by the oxidative gas generator 182, the volume of o-zone is delivered to the manifold 192 via a gas delivery line 190. The gas delivery line 190 can be a metal pipe, a PVC pipe, a hose, or the like, or any combination thereof. The manifold 192 can be a venturi injector (with or without a bypass manifold), a mixing valve, a diffuser, an aeration system, or the like, or any combination thereof. When the volume of o-zone gas reaches the manifold 192, the volume of o-zone gas is mixed with and at least partially sanitizes the soiled wash water in the recirculation line 170 as it flows through the manifold 192.

O-zone gas sanitizes by killing and/or inactivating microorganisms (e.g., bacteria, viruses, algae, mold, fungi, or the like), and can be many times more effective than chemicals. For example, o-zone gas can be approximately 150% more effective than chlorine and reacts over 3,000 times faster. O-zone gas is also advantageous because its chemical reactions do not leave any harmful byproducts. Because of its high oxidation potential, o-zone gas can precipitate a variety of organic and inorganic contaminates, including, for example, iron, manganese, sulfides, metals, body oils, sweat, and saliva. Further, o-zone gas oxidizes organic chemicals that are responsible for producing undesirable odors.

Advanced oxidative processes (often referred to as "AOP's") are a set of chemical treatment procedures designed to remove organic and/or inorganic materials in water using hydroxyl radicals (*OH). Generally, the chemistry in AOP's can be divided into three parts: (1) formation of hydroxyl radicals, (2) initial attacks by the hydroxyl radicals on target molecules, breaking the target molecules into fragments, and (3) subsequent attacks by hydroxyl radicals until ultimate mineralization. One subset of AOP chemical processes that produce hydroxyl radicals employs o-zone gas. First, o-zone gas ($O_3$) reacts with a hydroxyl ion ($HO^-$) to yield $HO_2^-$ and $O_2$ (oxygen). Next, a second o-zone molecule ($O_3$) reacts with the $HO_2^-$ produced in the previous step to yield $HO_2$ and $O_3^-$ (an ozonide radical). The ozonide radical ($O_3$) then reacts with $H^+$ to yield $HO_3^-$. Finally, the $HO_3^-$ produced during the previous step yields a hydrogen radical (*OH) and an oxygen molecule ($O_2$) upon protonation.

The hydroxyl radical is often referred to as the "detergent" of the troposphere because it reacts with many pollutants, decomposing them through "cracking", often acting as the first step to their removal. It also has an important role in eliminating some greenhouse gases like methane and ozone. The rate of reaction with the hydroxyl radical often determines how long many pollutants last in the atmosphere, if they do not undergo photolysis or are rained out. For instance methane, which reacts relatively slowly with hydroxyl radical, has an average lifetime of less than five years, and many CFCs have lifetimes of 50 years or more. Pollutants, such as larger hydrocarbons, can have very short average lifetimes of less than a few hours. The hydroxyl radicals first reaction with many volatile organic compounds (often referred to as "VOC's") having a chemical formula of RH, is the removal of a hydrogen atom, forming water ($H_2O$) and an alkyl radical (R*). The alkyl radical will typically react rapidly with oxygen ($O_2$) forming a peroxy radical (RO*2). The fate of this radical in the troposphere is dependent on factors such as the amount of sunlight, pollution in the atmosphere and the nature of the alkyl radical that formed it.

AOP's that form hydroxyl radicals are advantageous in the field of water treatment for a number of reasons. For example, hydroxyl radicals can effectively eliminate organic compounds in aqueous phase, rather than collecting or transferred pollutants into another phase. Due to the high reactivity of hydroxyl radicals, they react with almost every aqueous pollutant without discriminating, thereby allowing many organic contaminates to be removed at the same time. Hydroxyl radicals can also remove some heavy metals in the form of precipitated $M(OH)_x$. Because the complete reduction product of hydroxyl radicals is $H_2O$, AOP's do not introduce any new hazardous substances into the water.

As shown in FIG. 2, the counter-flow mixer 194 of the integral fluid sanitizer module 180 is positioned downstream of the manifold 192. The counter-flow mixer 194 includes a first portion 194a and a second portion 194b positioned downstream of the first portion 194a. Due to this geometry, water in the recirculation line 170 flows into the first portion 194a and then into the second portion 194b. The first portion 194a includes a first sanitizing lamp 196a disposed therein and the second portion 194b includes a second sanitizing lamp 196b disposed therein. When powered by a power source (not shown), the first sanitizing lamp 196a emits a first sanitizing wavelength of light and the second sanitizing lamp 196b emits a second sanitizing wavelength of light. These sanitizing wavelengths of light kill and/or inactivate microorganisms and can range between about 10 nm and about 400 nm. Preferably, the first and second sanitizing wavelengths of light are about 254 nm, which is commonly referred to as "germicidal ultra-violet light".

As water enters the first portion 194a of the counter-flow mixer 194, the water flows past the first sanitizing lamp 196a. The first sanitizing wavelength of light emitted by the first sanitizing lamp 196a sanitizes the water by killing and/or inactivating microorganisms and reacts with the volume of o-zone gas injected in the manifold 192 to convert $O_3$ molecules into hydroxyl radicals. The water then flows from the first portion 194a into the second portion 194b and flows past the second sanitizing lamp 196b. Like the first sanitizing wavelength of light, the second sanitizing wavelength of light emitted by the second sanitizing lamp 196b sanitizes the water and produces hydroxyl radicals by reacting with $O_3$ molecules. The geometry and flow pattern of the counter-flow mixer 194 causes press changes and turbulence in the water to increase the chemical reactions between the o-zone gas, the water, and the sanitizing wavelengths of light emitted by the first and second sanitizing lamps 196a, 196b. Sanitized water then exits the second portion 194b of the counter-flow mixer 194 and continues along the recirculation line 170 towards the optional storage tank 174 and the fluid inlet 104 (FIG. 1).

While the counter-flow mixer 194 is shown and described herein as including a first sanitizing lamp 196a and a second sanitizing lamp 196b, the counter-flow mixer 194 can include any number of sanitizing lamps (e.g., one sanitizing lamp, four sanitizing lamps, ten sanitizing lamps, etc.). In some implementations, the integrated fluid sanitizer module 180 does not include a counter-flow mixer and instead includes one or more sanitizing lamps at least partially disposed within the recirculation line 170.

In some implementations, the integrated fluid sanitizer module 180 includes a chemical feed line (not shown) that is coupled to the chemical reservoir or tank 154. The chemical feed line delivers chemicals into the recirculation line 170 to further aid in sanitizing the soiled wash water. The chemical feed line of the integrated fluid sanitizer module 180 can include one or more pumps (not shown) and/or valves (not shown) to control the flow of chemicals into the recirculation line 170. For example, the chemical feed line can deliver hydrogen peroxide into the recirculation line 170 (e.g., upstream of the manifold 192 and/or the counter-flow mixer 194). Hydrogen peroxide, which has a chemical formula of $H_2O_2$, is the simplest peroxide (i.e., a compound with an oxygen-oxygen single bond) and is often used as a weak oxidizer, bleaching agent, and disinfectant. For safety reasons, hydrogen peroxide is often handled as a dilute solution, rather than in its pure form.

In addition to producing hydroxyl radicals using o-zone gas, AOP's can employ hydrogen peroxide and ultra-violet light to produce hydroxyl radicals. When exposed to a wavelength of ultra-violet light (e.g., light having a wavelength between about 150 nm and about 250 nm), hydrogen peroxide yields hydroxyl radicals, which as described above, act as a sanitizing agent. Specifically, the ultra-violet wavelength of light causes hemolytic bond cleavage of the oxygen bond of one $H_2O_2$, molecule, resulting in the formation of two hydroxyl radicals. In this manner, injecting hydrogen peroxide into the recirculation line 170 such that it is exposed to the sanitizing wavelengths of light of the first and second sanitizing lamps 196a, 196b can force an AOP and produce hydroxyl radicals. Further, as described above, hydrogen peroxide is one of the chemicals that can be used in the one or more wash cycles (e.g., during the main wash cycle 120) as a bleaching agent and/or disinfectant. Thus, hydrogen peroxide may already be present in the soiled wash water in the recirculation line 170 and can force additional AOP's to Referring to FIG. 1, sanitized water in the recirculation line 170 downstream of the integrated fluid sanitizer module 180 is delivered to the fluid inlet 104 of the housing 102 by use of the pump 172, or one or more additional pumps (not shown) for use in the wash session. In this manner, soiled wash water from any one of the one or more wash cycles can be sanitized and reused in a different one of the one or more wash cycles of the same wash session. For example, the recirculation line 170 can receive soiled wash water via the drain line 160 and drain valve 162 subsequent to the optional pre-wash cycle 110, sanitize the soiled wash water using the integrated fluid sanitizer module 180, and deliver sanitized water to the fluid inlet 104 for use during the main wash cycle 120, the rinse cycle 130, or the optional press/spin cycle 140. Likewise, the recirculation line 170 can receive soiled wash water via the drain line 160 and drain valve 162 subsequent to the main wash cycle 120, sanitize the soiled wash water using the integrated fluid sanitizer module 180, and deliver sanitized water to the fluid inlet 104 for use during the rinse cycle 130 or the optional press/spin cycle 140. In addition, the recirculation line 170 can receive soiled wash water via the drain line 160 and drain valve 162 subsequent to the rinse cycle 130, sanitize the soiled wash water using the integrated fluid sanitizer module 180, and deliver sanitized water to the fluid inlet 104 for use during the optional press/spin cycle 140.

In some implementations, the recirculation line 170 includes an optional storage tank 174 positioned downstream of the integrated fluid sanitizer module 180 that receives and stores the sanitized water from the integrated fluid sanitizer module 180. In such implementations, the sanitized water can be delivered from the optional storage tank 174 to the fluid inlet 104 of the housing 102 for use in the wash session or a second wash session. For example, the recirculation line 170 can receive soiled wash water subsequent to the optional press/spin cycle via the drain line 160 and drain valve 162, sanitize the soiled wash water using the integrated fluid sanitizer module 180, and deliver sanitized water to the optional storage tank 174 for use during for use during any one of the one or more cycles of a second wash session (e.g., a rinse cycle of the second wash session). As described above, hydrogen peroxide can be delivered by the chemical reservoir or tank 154 during one of the one or more wash cycles of the wash session. When sanitized water is delivered back into the housing 102 from the recirculation line 170, a residual volume of o-zone gas remains in the sanitized water. Thus, the residual o-zone gas reacts with the hydrogen peroxide used during, for example, the rinse cycle 130 to produce hydroxyl radicals that can clean (e.g., whiten and brighten) the laundry.

The controller 108 is generally used to control the operation of the various elements of the washing system 100 and includes one or more processors and an associated memory device for storing instructions that are executable by the one or more processors. The controller 108 also includes a communication module that is communicatively coupled (e.g., by a wireless connection and/or a wired connection) to the various components of the washing system 100, such as the fluid inlet 104, the fluid outlet 106, the drain valve 162, the pump 172, the integral fluid sanitizer module 180, the optional storage tank 174, the fresh water reservoir or tank 150, the chemical reservoir or tank 154, or any combination thereof. The controller 108 can also include a human-machine interface ("HMI"), such as a touchscreen interface, to permit a user to control the various components of the washing system 100. For example, the HMI of the controller 108 can permit the user to select whether to operate the optional pre-wash cycle 110 or the optional press/spin cycle 140, to select the volume of wash water that the drain valve 162 diverts to the recirculation line 170, etc.

While the washing system 100 is shown as including all of the components described above, more or fewer components can be included in a washing system. For example, an alternative washing system (not shown) includes the housing 102, the drain line 160, and the recirculation line 170. Thus, various washing systems can be formed using any portion of the basic components described herein.

Figure 3:
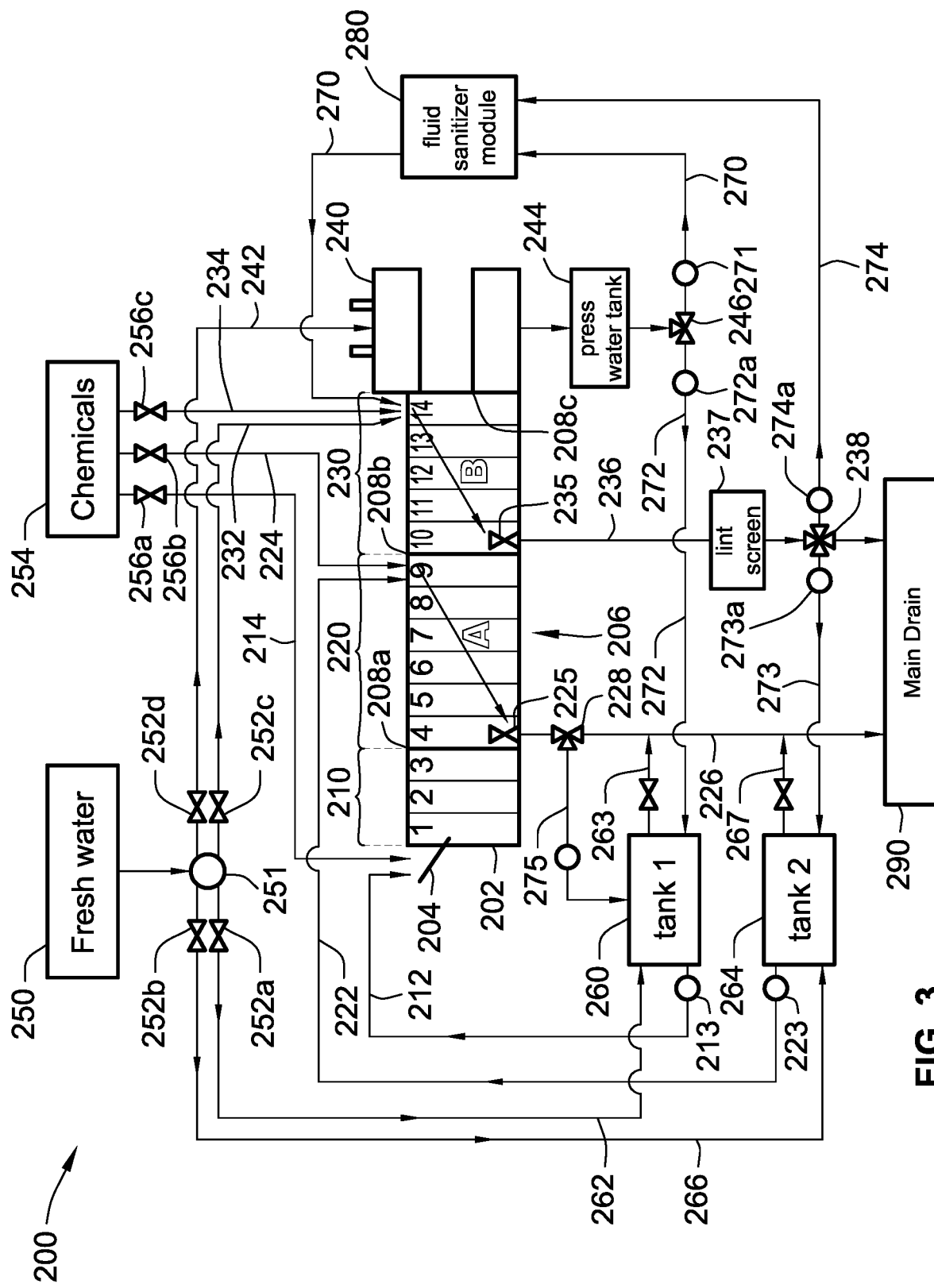
FIG. 3 is a schematic illustration of a tunnel washing system according to some implementations of the present disclosure.

Referring to FIG. 3, a tunnel washing system 200 that is similar to the washing system 100 includes a wash tunnel 202, a press 240, a fresh water reservoir 250, a chemical reservoir 254, a first tank 260, a second tank 264, a first recirculation line 270, a second recirculation line 272, a third recirculation line 273, an optional fourth recirculation line 274, and an optional fifth recirculation line 275. The tunnel washing system 200 is generally used to efficiently clean large volumes of soiled laundry.

The wash tunnel 202 includes a loading hopper 204, a helix that defines a plurality of modules 206, a first seal 208a, a second seal 208b, and a third seal 208c. The helix is disposed within the wash tunnel 202 and has a helix/corkscrew shape which defines the plurality of modules 206. The first seal 208a, the second seal 208b, and the third seal 208c are positioned within the wash tunnel 202 such that the first seal 208a defines a pre-wash zone 210, the first seal 208a and the second seal 208b define a main wash zone 220, and the second seal 208b and the third seal 208c define a rinse zone 230. As shown, the pre-wash zone 210 includes modules 1, 2, and 3 of the plurality of modules 206, the main wash zone 220 includes modules 4, 5, 6, 7, 8, and 9 of the plurality of modules 206, and the rinse zone 230 includes modules 10, 11, 12, 13, and 14 of the plurality of modules 206.

Each of the plurality of modules 206 includes perforations (not shown) to permit fluid to flow between adjacent modules within the pre-wash zone 210, the main wash zone 220, and the rinse zone 230 (e.g., between module 1 and module 2). The seals 208a, 208b, and 208c inhibit fluid from freely flowing between adjacent modules of the plurality of modules 206 (e.g., between module 9 and module 10). More specifically, the first seal 208a inhibits fluid flow between the pre-wash zone 210 and the main wash zone 220, the second seal 208b inhibits fluid flow between the main wash zone 220 and the rinse zone 230, and the third seal 208c inhibits fluid flow between the rinse zone 230 and the press 240. As a result, fluid flows through the plurality of modules 206 along arrow A in the main wash zone 220, and fluid flows through the plurality of modules 206 along arrow B in the rinse zone 230.

To operate the tunnel washing system 200, soiled laundry is placed into the wash tunnel 202 through the loading hopper 204 and falls into module 1 of the plurality of modules 206 in the pre-wash zone 210. The helix oscillates back and forth within the wash tunnel 202 along a central axis to agitate the soiled laundry within the first module for a predetermined period (e.g., between about one minute and about two minutes). After the predetermined period, the helix rotates a full revolution about its central axis, and the soiled laundry is exchanged from module 1 to module 2 of the plurality of modules 206 through a generally central throughhole of the helix. In this manner, the soiled laundry moves through the plurality of modules 206 of the wash tunnel 202 towards the press 240.

While the plurality of modules 206 of the wash tunnel 202 is shown as having fourteen modules, the plurality of modules 206 can have any number of modules based on the geometry of the helix (e.g., three modules, ten modules, twenty modules, thirty modules, etc.). While not shown, the wash tunnel 202 can also include a finish zone positioned between the third seal 208c and the press 240. The finish zone is generally used to administer a final treatment of water/chemicals to the laundry prior to entering the press 240, and can comprise two modules of the plurality of modules 206.

The fresh water reservoir 250 is the same as, or similar to, the fresh water reservoir or tank 150 of the washing system 100 described above and includes a fresh water pump 251, a first fresh water valve 252a, a second fresh water valve 252b, a third fresh water valve 252c, a fourth fresh water valve 252d. The fresh water pump 251 pumps fresh water from the fresh water reservoir 250 towards the fresh water valves 252a, 252b, 252c, and 252d. The chemical reservoir 254 is the same as, or similar to, the chemical reservoir or tank 154 of the washing system 100 described above and includes a first chemical valve 256a, a second chemical valve 256b, and a third chemical valve 256c. The chemical reservoir 254 can include a pump (not shown) that is the same as, or similar to, the fresh water pump 251.

The first tank 260 includes a first tank feed line 262 that is coupled to the first fresh water valve 252a and a first overflow line 263. The first tank feed line 262 delivers fresh water from the fresh water reservoir 250 to the first tank 260 for storage therein. The fresh water pump 251 and the first fresh water valve 252a control the volume of fresh water that flows into the first tank 260 through the first tank feed line 262. Similarly, the second tank 264, which is the same as, or similar to, the first tank 260, includes a second tank feed line 266 that is the same as, or similar to, the first tank feed line 262 and is coupled to the second fresh water valve 252b. The second tank 264 also includes a second overflow line 267. The first tank feed line 262 and the second tank feed line 266 can be a metal pipe, a PVC pipe, a hose, or the like, or any combination thereof.

The pre-wash zone 210 of the wash tunnel 202 includes a pre-wash feed line 212 and a pre-wash chemical feed line 214. The pre-wash feed line 212 is coupled to the first tank 260 and includes a pump 213. The pump 213 pumps fluid stored in the first tank 260 (e.g., fresh water delivered by the first tank feed line 262 described above) through the pre-wash feed line 212 and into the pre-wash zone 210 (e.g., into the loading hopper 204 and/or module 1). The pre-wash chemical feed line 214 is coupled to the first chemical valve 256a of the chemical reservoir 254 and delivers chemicals to the pre-wash zone 210 (e.g., into the loading hopper 204 and/or module 1). The chemicals delivered by the pre-wash chemical feed line 214 and the fluid delivered by the pre-wash feed line 212 mix to form pre-wash water that is then used in the pre-wash zone 210.

The main wash zone 220 of the wash tunnel 202 includes a main wash feed line 222 and a wash chemical feed line 224. The main wash feed line 222 is coupled to the second tank 264 and includes a pump 223. The pump 223 pumps fluid stored in the second tank 264 (e.g., fresh water delivered by the second tank feed line 266 described above) through the main wash feed line 222 and into the main wash zone 220 (e.g., into module 9). The wash chemical feed line 224 is coupled to the second chemical valve 256b of the chemical reservoir 254 and delivers chemicals into the pre-wash zone 210 (e.g., into module 9). The chemicals delivered by the wash chemical feed line 224 and the fluid delivered by the main wash feed line 222 mix to form wash water that is then used in the main wash zone 220.

The rinse zone 230 of the wash tunnel 202 includes a fresh water feed line 232 and a rinse chemical feed line 234. The fresh water feed line 232 is coupled to the third fresh water valve 252c of the fresh water reservoir 250 and delivers fresh water from the fresh water reservoir 250 to the rinse zone 230 (e.g., into module 14). The rinse chemical feed line 234 is coupled to the third chemical valve 256c of the chemical reservoir 254 and delivers chemicals into the rinse zone 230 (e.g., into module 14). The chemicals delivered by the rinse chemical feed line 234 and the fresh water delivered by the fresh water feed line 232 mix to form rinse water that is then used in the rinse zone 230.

As shown, the press 240 is positioned directly adjacent to the rinse zone 230 and includes a press water feed line 242 and a press water tank 244. Laundry exits the rinse zone 230 of the wash tunnel 202 and enters the press 240. The press 240 is generally used to remove excess rinse water from the laundry prior to transporting the laundry to a dryer. The press 240 removes excess water by compressing or squeezing the laundry to expel excess water ("soiled press water") using hydraulic mechanisms or the like. The press water feed line 242 is coupled to the fourth fresh water valve 252d of the fresh water reservoir 250 and delivers fresh water from the fresh water reservoir 250 to the press 240. The press water tank 244 receives and stores the soiled press water and includes a press water diversion valve 246.

The first recirculation line 270 is coupled to the press water diversion valve 246 and includes a pump 270a and an integrated fluid sanitizer module 280. The first recirculation line 270 receives a portion of the soiled press water from the press water tank 244 via the press water diversion valve 246. The integrated fluid sanitizer module 280 is the same as or similar to the integrated fluid sanitizer module 180 of the washing system 100 described above and is used to at least partially sanitize the portion of the soiled press water received by the first recirculation line 270. The pump 270a pumps the portion of the soiled press water through the first recirculation line 270 and the integrated fluid sanitizer module 280 to the rinse zone 230 (e.g., as shown, into module 14). The first recirculation line 270 can be a metal pipe, a PVC pipe, a hose, or the like, or any combination thereof. In some implementations, the first recirculation line 270 includes a storage tank (not shown) that is the same as or similar to the optional storage tank 174 of the washing system 100.

The second recirculation line 272 is similar to the first recirculation line 270 in that it is coupled to the press water diversion valve 246 and includes a pump 272a. The second recirculation line 272 receives a second portion of the soiled press water from the press water tank 244 via the press water diversion valve 246. The second recirculation line 272 differs from the first recirculation line in that it is coupled to the first tank 260, and the pump 272a pumps the second portion of the soiled press through the second recirculation line 272 to the first tank 260. The second portion of the soiled press water mixes with the fresh water delivered to the first tank 260 via the first tank feed line 262. As described above, the pre-wash feed line 212 delivers fluid from the first tank 260 to the pre-wash zone 210, meaning that at least some of the second portion of the soiled press water received by the first tank 260 is delivered to the pre-wash zone 210 via the pre-wash feed line 212.

Like the first recirculation line, the second recirculation line 272 can be a metal pipe, a PVC pipe, a hose, or the like, or any combination thereof. While not shown, in some implementations, the second recirculation line can include a second integrated fluid sanitizer module that is the same as or similar to the integrated fluid sanitizer module 280 of the first recirculation line and the integrated fluid sanitizer module 180 of the washing system 100. In other implementations, the press tank can include an integrated fluid sanitizer module that is the same as or similar to the integrated fluid sanitizer module 280 that sanitizes the press water prior to being delivered to the first recirculation line 270 and/or second recirculation line 272.

The press water diversion valve 246 controls amount of soiled press water that flows into either the first recirculation line 270 or the second recirculation line 272. For example, desirably, the press water diversion valve 246 diverts about thirty percent to about fifty percent of the soiled press water from the press water tank 244 to the first recirculation line 270 and about seventy percent to about thirty percent of the soiled press water from the press water tank 244 to the second recirculation line 272. Diverting about thirty percent to about fifty percent of the soiled press water to the first recirculation line 270 helps prevent the first tank 260 from overflowing due to the second recirculation line 272.

As described above, the rinse zone 230 uses rinse water which comprises fresh water received via the fresh water feed line 232, chemicals received via the rinse chemical feed line 234, and/or sanitized press water received via the first recirculation line 270. As shown in FIG. 3 and described above, the rinse water generally flows between module 14 and module 10 along arrow B. The rinse zone 230 includes a rinse water drain 235 (often referred to as a "weir box") to control the rinse water level in the rinse zone 230 and to drain soiled rinse water that has been contaminated by the laundry (e.g., rinse water that has flowed from module 14 to module 10). The rinse water drain 235 is coupled to a rinse drain line 236 that receives the soiled rinse water. The rinse drain line 236 includes a lint screen 237 and a rinse water diversion valve 238. As shown, the lint screen 237 is integral with the rinse drain line 236 and is positioned upstream of the rinse water diversion valve 238. The lint screen 237 removes lint that has accumulated in the soiled rinse water from the laundry. The rinse drain line 236 continues past the rinse water diversion valve 238 and is coupled to a main drain 290 that is the same as or similar to the main drain 164 of the washing system 100 (e.g., a sewage line).

The third recirculation line 273 is coupled to the rinse water diversion valve 238 and includes a pump 273a. The third recirculation line 273 receives a portion of the soiled rinse water from the rinse drain line 236 via the rinse water diversion valve 238. The third recirculation line 273 is also coupled to the second tank 264, and the pump 273a pumps the portion of the soiled rinse water through the third recirculation line 273 to the second tank 264. The portion of the soiled rinse water then mixes with the fresh water delivered to the second tank 264 via the second tank feed line 266. As described above, the main wash feed line 222 delivers fluid from the second tank 264 to the main wash zone 220. As a result, at least some of the portion of the soiled rinse water received by the second tank 264 is delivered to the main wash zone 220 via the main wash feed line 222.

The third recirculation line 273 is the same as or similar to the first and second recirculation lines 270, 272 in that the third recirculation line 273 can be a metal pipe, a PVC pipe, a hose, or the like, or any combination thereof, and can include an integrated fluid sanitizer module (not shown) that is the same as or similar to the integrated fluid sanitizer module 280. Alternatively, the rinse drain line 236 can include an integrated fluid sanitizer module that is the same as or similar to the integrated fluid sanitizer module 280 and sanitizes the soiled rinse water upstream of the rinse water diversion valve 238.

In some implementations, the tunnel washing system 200 includes the optional fourth recirculation line 274, which is coupled to the rinse water diversion valve 238 and includes a pump 274a. The optional fourth recirculation line 274 is similar to the third recirculation line 273 in that it is coupled to the rinse water diversion valve 238 and receives a second portion of the soiled rinse water from the rinse drain line 236. More specifically, in such implementations, the rinse water diversion valve 238 is a four-way valve that is used to control the respective volumes of the portion of the soiled rinse water received by the third recirculation line 273, the second portion of the soiled rinse water received by the optional fourth recirculation line 274, and a third portion of the soiled rinse water received by the main drain 290. As shown, the optional fourth recirculation line 274 is connected to first recirculation line 270 so that second portion of the soiled rinse water flows through the integrated fluid sanitizer module 280 and is sanitized. As described above, the first recirculation line 270 delivers fluid from the integrated fluid sanitizer module 280, thus, in such implementations, the first recirculation line 270 delivers sanitized rinse water to the rinse zone 230 (e.g., into module 14). Alternatively, the optional fourth recirculation line 274 can include a fourth integrated fluid sanitizer module (not shown) that is the same as or similar to the integrated fluid sanitizer module 280, and the fourth recirculation line directly delivers sanitized rinse water to the rinse zone 230.

As described above, the main wash zone 220 uses wash water which comprises fluid from the first tank 260 received via the main wash feed line 222 and/or chemicals received via the wash chemical feed line 224. As shown in FIG. 3 and described above, the wash water generally flows between module 9 and module 4 along arrow A. The main wash zone 220 includes a wash water drain 225 (often referred to as a "weir box") to control the wash water level in the main wash zone 220 and to drain soiled wash water (e.g., wash water that has flowed from module 9 to module 4 and has become contaminated by the soiled laundry). The wash water drain 225 is coupled to a wash water drain line 226 that receives the soiled wash water and has a wash water diversion valve 228. The wash water drain line 226 continues downstream of the wash water diversion valve 228 and is coupled to the main drain 290. As shown, the overflow line 263 of the first tank 260 and the overflow line 267 of the second tank 264 are coupled to the wash water drain line 226 downstream of the wash water diversion valve 228, permitting overflow from the first tank 260 and/or second tank 264 to spill into the main drain 290 and exit the system.

In some implementations, the tunnel washing system 200 includes an optional fifth recirculation line 275 that is coupled to the wash water diversion valve 228 and includes a pump 275a. The optional fifth recirculation line 275 is similar to the optional fourth recirculation line 274 in that it receives a second portion of the soiled wash water from the wash water drain line 226 via the wash water diversion valve 228. As shown, the optional fifth recirculation line 275 is coupled to the first tank 260, and the pump 275a pumps the second portion of the soiled wash water through the fifth recirculation line 275 and into the first tank 260. As described above, the pre-wash feed line 212 delivers fluid from the first tank 260 to the pre-wash zone 210, thus, in such implementations, the pre-wash feed line 212 delivers at least a some of the second portion of soiled wash water stored in the first tank 260 to the pre-wash zone 210.

In some implementations, the optional fifth recirculation line 275 can include an integrated fluid sanitizer that is the same as or similar to the integrated fluid sanitizer module 280 of the first recirculation line 270 to sanitize the soiled wash water prior delivering it to the first tank 260. Further the fifth recirculation line 275 can be coupled to the pre-wash zone 210 (e.g., via the loading hopper 204) to directly deliver soiled wash water to the pre-wash zone 210.

Figure 4A:
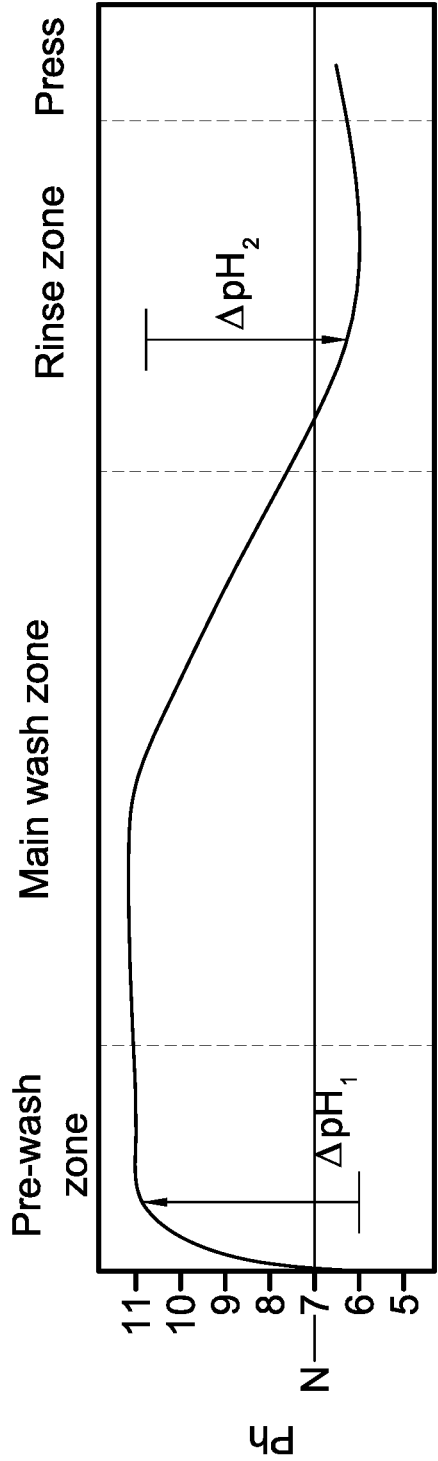
FIG. 4A is a plot of the pH of pre-wash zone water, wash zone water, rinse zone water, and press water in a first washing system according to some implementations of the present disclosure.
Figure 4B:
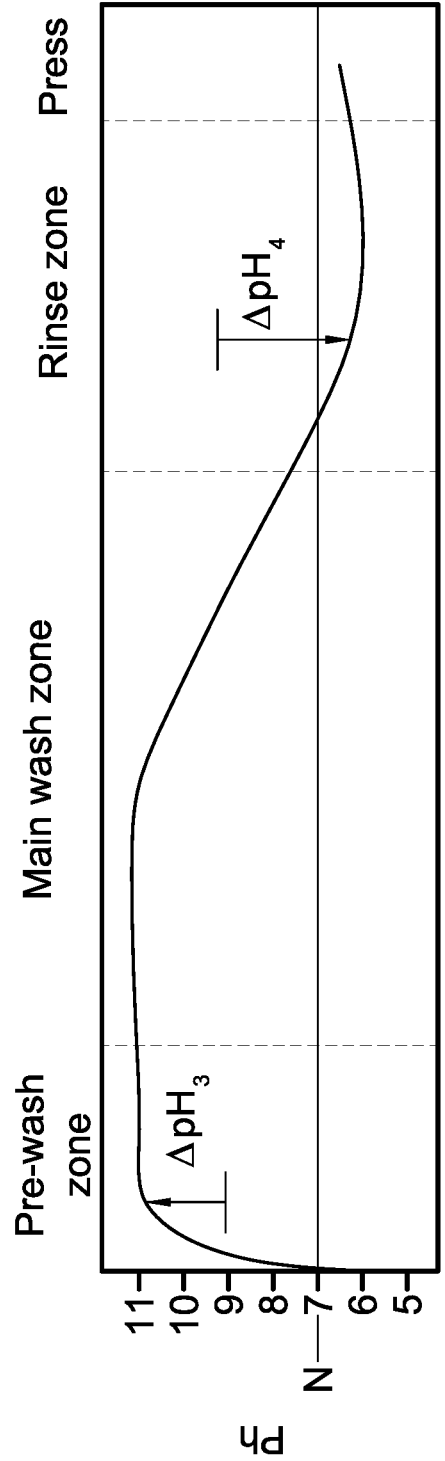
FIG. 4B is a plot of the pH of pre-wash zone water, wash zone water, rinse zone water, and press water in a second washing system according to some implementations of the present disclosure.

Referring generally to FIGS. 4A and 4B, the pH of the pre-wash water, the wash water, and the rinse water of a washing system can be controlled to effectively clean soiled laundry. As shown, it is desirable that the pH of the pre-wash zone water is between about 9 and about 10.5, the pH of the main wash zone water is between about 10.5 and about 7, and the pH of the rinse zone water and press water is between about 5 and about 6. In other words, the pre-wash zone and a first half of the main wash zone comprise a high alkalinity zone (i.e., high pH) and a second half of the main wash zone, the rinse zone, and the press comprise a low alkalinity zone (i.e., low pH).

FIG. 4A shows the pH of pre-wash zone water, main wash zone water, rinse zone water, and press water of a first washing system that is similar to the tunnel washing system 200 described above. The first washing system differs from the tunnel washing system 200 in that it does not include a first recirculation line, a fourth recirculation line, or a fifth recirculation line. As described above, the pre-wash zone receives fluid from the first tank, which includes fresh water and soiled press water, meaning that the pH of the fluid delivered from the first tank to the pre-wash zone is about 6. To raise the pH of the pre-wash zone water to be between about 10.5 and about 11, chemicals must be added to the pre-wash zone via a chemical feed line that is the same as or similar to the pre-wash chemical feed line 214 described above. This required change in pH in the pre-wash zone is illustrated by $\Delta pH_1$ in FIG. 4A. Similarly, laundry enters into the rinse zone from the high alkalinity zone (i.e., with a high pH) saturated with wash water, and the rinse zone receives rinse water a fresh water feed line that is the same as or similar to the fresh water feed line 232 described above. Thus, chemicals (e.g., sours, parasitic acid, hydrogen peroxide, or any other suitable chemical with a low pH) must be delivered to the rinse zone via a chemical feed line that is the same as or similar to the rinse chemical feed line 234 to lower the pH of the rinse zone water to be between about 5 and about 6. The required change in pH in the rinse zone is illustrated by $\Delta pH_2$ in FIG. 4A.

FIG. 4B shows the pH the pre-wash zone water, main wash zone water, rinse zone water, and press water of a second washing system that is similar to the first washing system and the tunnel washing system 200 described above. The first washing system differs from the first washing system in that it includes a first recirculation line that is the same as or similar to the first recirculation line 270 of the tunnel washing system 200 and a fifth recirculation line that is the same as or similar to the optional fifth recirculation line 275 of the tunnel washing system 200. The fifth recirculation line delivers soiled wash water, which has a pH of between about 10.5 and about 11, to the first tank. As a result, the pH of the fluid in the first tank is raised to about 9.5 prior to being delivered to the pre-wash zone, meaning that the required change in pH at the beginning of the pre-wash zone denoted by $\Delta pH_3$ is substantially less than $\Delta pH_1$ in FIG. 4A for the first washing system. Similarly, the first recirculation line delivers sanitized press water to the rinse zone having a pH of between about 5 and about 6. Thus, the required change in pH in the rinse zone, which is denoted by $\Delta pH_4$, is substantially less than $\Delta pH_3$ in FIG. 4A for the first washing system. In other words, fewer chemicals are required to obtain the desired pH level in the pre-wash zone and in the rinse zone, reducing the costs to operate the second washing system as compared to the first washing system.

While the integrated fluid sanitizer modules 180, 280 have been described herein as being used in a recirculation line (e.g., recirculation line 170), the integrated fluid sanitizer modules can be used in other portions of the wash systems 100, 200. For example, the wash water drain line 226 can include an integrated fluid sanitizer module that is the same as, or similar to, the integrated fluid sanitizer 180. In such implementations, soiled water wash is at least partially sanitized by the integrated fluid sanitizer module prior to being discharged into the main drain 290 (e.g., a sewage line).

EXAMPLES

In one example, a washing system that is similar to the washing systems 100 and 200 described above in that it includes an integrated fluid sanitizer module (e.g., the integrated fluid sanitizer module 180 shown in FIG. 2). The water in this washing system was tested to demonstrate the reduction in bacteria in the water after passing through the integrated fluid sanitizer module. Table 1 shows the test results in colony-forming units per milliliter ("CFU"):

TABLE 1

| | Pre-Aerobic Plate Count of Water Pre-treatment | Pre-Aerobic Plate Count of Water Post-treatment | Method |
|---|---|---|---|
| Test #1 | 37 CFU/mL | 3 CFU/mL | SM 9215B $20^{th}$ Ed. |
| Test #2 | 73 CFU/mL | 8 CFU/mL | SM 9215B $20^{th}$ Ed. |

As indicated by the test results in Table 1, the integrated fluid sanitizer caused a 99.92% reduction in bacteria in Test #1 and a 99.89% reduction in bacteria in Test #2 (using a logarithmic scale reduction). For water to be considered potable (i.e., drinkable), the Safe Drinking Water Act currently requires the Maximum Contaminant Level ("MCL") of microorganisms to be below 200 MCL.

To further demonstrate that the integrated fluid sanitizer module continuously disinfects water as it recirculates through the washing system multiple times, a second test was completed to measure the contaminates before and after a first recirculation loop, and before and after a second recirculation loop. Table 2 below summarizes the results:

TABLE 2

|  | Pre-Aerobic Plate Count of Water at Beginning of Loop | Pre-Aerobic Plate Count of Water at End of Loop | Method |
| --- | --- | --- | --- |
| Loop #1 | 7 CFU/mL | 5 CFU/mL | SM 9215B 20$^{th}$ Ed. |
| Loop #2 | 36 CFU/mL | 21 CFU/mL | SM 9215B 20$^{th}$ Ed. |

As indicated by the test results in Table 2, the integrated fluid sanitizer module continued to reduce bacteria in the water during multiple recirculation cycles in the washing system. Thus, the integrated fluid sanitizer module can be used to at least partially sanitize the same recirculation water multiple times.

While the disclosure is susceptible to various modifications and alternative forms, specific embodiments and methods thereof have been shown by way of example in the drawings and are described in detail herein. It should be understood, however, that it is not intended to limit the disclosure to the particular forms or methods disclosed, but, to the contrary, the intention is to cover all modifications, equivalents and alternatives falling within the spirit and scope of the disclosure.

What is claimed is:

1. A washing system comprising:
   a housing including a fluid inlet;
   an oxidative gas generator including a first ultraviolet lamp configured to emit light at a first wavelength, wherein the oxidative gas generator is configured to produce o-zone gas, and wherein the oxidative gas generator is fluidly coupled to a manifold;
   the manifold, wherein the manifold is fluidly coupled to the fluid inlet and configured to introduce the o-zone gas to a fluid; and
   a second ultraviolet lamp configured to emit light at a second wavelength, wherein the second ultraviolet lamp is positioned downstream from the manifold and configured to apply the light at the second wavelength to the fluid.

2. The washing system of claim 1, wherein the first wavelength is between about 180 nm and about 260 nm and wherein the second wavelength is between about 10 nm and 400 nm.

3. The washing system of claim 2, wherein the first wavelength is between about 180 nm and 200 nm and wherein the second wavelength is between about 245 nm and 265 nm.

4. The washing system of claim 1, wherein the manifold is located on a recirculation line.

5. The washing system of claim 1, wherein the light at the first wavelength reacts with ambient air to produce the o-zone gas.

6. The washing system of claim 1, wherein the o-zone gas oxidizes the fluid to produce one or more of peroxone and hydroxyl radicals.

7. The washing system of claim 1, wherein the light at the second wavelength at least partially sanitizes the fluid.

8. The washing system of claim 1, wherein the light at the second wavelength reacts with the fluid to create an advanced oxidation process.

9. The washing system of claim 1, wherein the fluid includes chemicals.

10. The washing system of claim 1, wherein the washing system utilizes a main wash cycle and a rinse cycle, and wherein the fluid is used during the rinse cycle.

11. A tunnel washing system comprising:
    a housing including a pre-wash zone, a main wash zone, and a rinse zone, the rinse zone a fluid inlet and a fluid outlet;
    a recirculation line fluidly coupled to the fluid inlet and the fluid outlet and configured to supply fluid to the fluid inlet, the recirculation line including a manifold;
    an oxidative gas generator including a first ultraviolet lamp configured to emit light at a first wavelength, wherein the oxidative gas generator is configured to produce o-zone gas, and wherein the oxidative gas generator is fluidly coupled to the manifold; and
    a second ultraviolet lamp configured to emit light at a second wavelength, wherein the second ultraviolet lamp is positioned downstream from the manifold and configured to apply the light at the second wavelength to the fluid.

12. The tunnel washing system of claim 11, wherein the first wavelength is between about 180 nm and about 260 nm and wherein the second wavelength is between about 10 nm and 400 nm.

13. The tunnel washing system of claim 12, wherein the first wavelength is between about 180 nm and 200 nm and wherein the second wavelength is between about 245 nm and 265 nm.

14. The tunnel washing system of claim 11, wherein the fluid when delivered to the rinse zone via the fluid inlet has a pH of between about 5 and about 6.

15. The tunnel washing system of claim 11, wherein the light at the first wavelength reacts with ambient air to produce the o-zone gas.

16. The tunnel washing system of claim 11, wherein the o-zone gas oxidizes the fluid to produce one or more of peroxone and hydroxyl radicals.

17. The tunnel washing system of claim 11, wherein the light at the second wavelength at least partially sanitizes the fluid.

18. The tunnel washing system of claim 11, wherein the light at the second wavelength reacts with the fluid to create an advanced oxidation process.

19. The tunnel washing system of claim 11, wherein the fluid includes chemicals.

20. The tunnel washing system of claim 11, wherein the fluid contains hydrogen peroxide.

* * * * *